T. T. KNEELAND.
Sorghum Evaporator.
No. 54,366. Patented May 1, 1866.
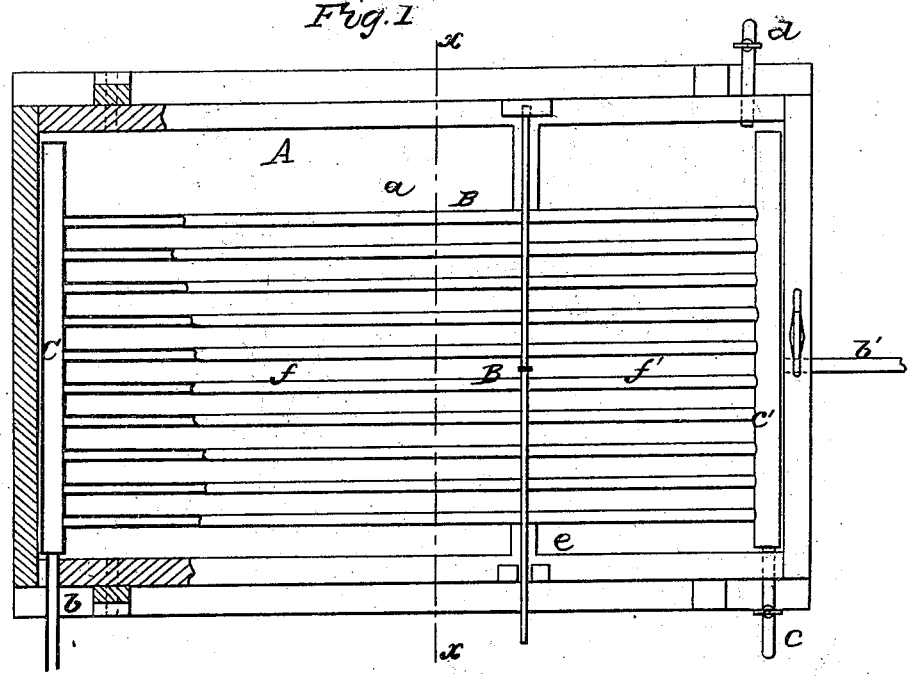
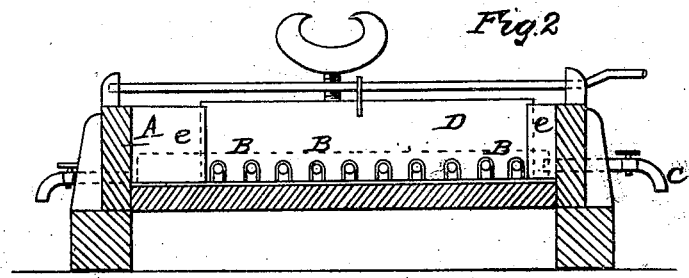

UNITED STATES PATENT OFFICE.

T. T. KNEELAND, OF TECUMSEH, MICHIGAN.

IMPROVED SORGHUM-EVAPORATOR.

Specification forming part of Letters Patent No. 54,366, dated May 1, 1866.

*To all whom it may concern:*

Be it known that I, T. T. KNEELAND, of Tecumseh, in the county of Lenawee and State of Michigan, have invented a new and Improved Sugar-Cane or Sorghum Evaporator; and I do hereby declare that the following is a full, clear, and exact description thereof, which will enable those skilled in the art to make and use the same, reference being had to the accompanying drawings, forming part of this specification, in which—

Figure 1 is a plan or top view of my invention, partly in section; Fig. 2, a transverse vertical section of the same, taken in the line $x\ x$, Fig. 1.

Similar letters of reference indicate corresponding parts.

This invention relates to a new and improved device for evaporating, by means of steam, the juice of the sugar-cane, more particularly the juice of the kind of sugar-cane termed "sorghum."

The invention consists in the employment or use of a series of steam-tubes fitted within a shallow pan provided with a gate, all arranged in such a manner that the juice may be evaporated expeditiously, and the necessary manipulation performed with the greatest facility.

A represents a pan, which may be constructed with a wooden bottom and sides, the bottom being covered with sheet metal $a$.

B represents a series of parallel tubes, the ends of which communicate with tubes C C', larger in diameter than the tubes B. These tubes may be constructed of copper, and they are fitted within the pan A, resting upon its bottom.

The steam is admitted into one end of one of the tubes C, as shown at $b$, and is discharged at the center of the other tube, C', as shown at $b'$, the water of condensation being discharged through a faucet, $c$, at one end of C'. (See Fig. 1.)

The sirup is discharged from the pan A, as shown at $d$.

D represents a gate, which extends the whole width of the pan A, and has its lower edge notched to receive the tubes B, and fit snugly around the same to form a partition in A, and at the sides of the pan A, at their inner surfaces, there are attached strips $e\ e$, in which grooves are made to receive the ends of the gate, and hold or retain the same in position and divide the pan into two compartments, $f\ f'$.

At the commencement of the operation the gate D may be removed, and the juice, being placed in the pan, and the steam allowed to pass through the tubes B C C', the juice will become heated and the evaporation take place. After the juice has been concentrated to a certain degree the gate D is inserted in the pan at the end $a^{x}$, and shoved along so as to push the concentrated juice toward the discharge end, and the gate being then fitted in the strips $e\ e$, the concentrated juice is subjected to the finishing process in the compartment $f'$, while fresh juice is admitted into compartment $f$. Thus, by this very simple arrangement, I obtain a very efficient and economical pan for evaporating the juice of sugar-cane, and one which will admit of the necessary manipulations required in evaporating sugar-cane juice being performed with facility.

Having thus described my invention, what I claim as new, and desire to secure by Letters Patent, is—

The pan A, provided with a series of steam-pipes, B C, in combination with the gate D, all arranged to operate in the manner substantially as and for the purpose herein set forth.

THOS. T. KNEELAND.

Witnesses:
   WM. MCVAIR,
   WM. RICHARD.